United States Patent [19]

Nunokawa et al.

[11] Patent Number: 5,772,340
[45] Date of Patent: Jun. 30, 1998

[54] TAPE PRINTING APPARATUS

[75] Inventors: Masahiko Nunokawa, Nagano-ken; Kenji Watanabe, Tokyo, both of Japan

[73] Assignees: Seiko Epson Corporation; King Jim Co., Ltd., both of Tokyo, Japan

[21] Appl. No.: 507,517

[22] PCT Filed: Dec. 21, 1994

[86] PCT No.: PCT/JP94/02172

§ 371 Date: Nov. 20, 1995

§ 102(e) Date: Nov. 20, 1995

[87] PCT Pub. No.: WO95/17309

PCT Pub. Date: Jun. 29, 1995

[30] Foreign Application Priority Data

Dec. 22, 1993 [JP] Japan .................................. 5-325163

[51] Int. Cl.⁶ ...................................................... B41J 3/00
[52] U.S. Cl. .............................. 400/70; 400/76; 400/586; 400/615.2
[58] Field of Search ................................. 400/61, 62, 63, 400/70, 76, 586, 615.2

[56] References Cited

U.S. PATENT DOCUMENTS

| | | | |
|---|---|---|---|
| 5,374,132 | 12/1994 | Kimura | 400/586 |
| 5,399,030 | 3/1995 | Niwa et al. | 400/586 |
| 5,480,246 | 1/1996 | Morimoto | 400/615.2 |
| 5,494,360 | 2/1996 | Watanabe et al. | 400/615.2 |
| 5,549,399 | 8/1996 | Sakuragi et al. | 400/63 |

FOREIGN PATENT DOCUMENTS

| | | |
|---|---|---|
| 0306157A3 | 8/1988 | European Pat. Off. . |
| 5-50657 | 3/1993 | Japan . |
| 5-185663 | 7/1993 | Japan . |
| A5177905 | 10/1993 | Japan . |
| 5-298464 | 11/1993 | Japan . |
| 5-338267 | 12/1993 | Japan . |

OTHER PUBLICATIONS

Patent Abstracts of Japan, vol. 17 No. 595 (M–1503), 29 Oct. 1993 re: JP–A–05 177905 20 Jul. 1993.

Patent Abstracts of Japan, vol. 9 No. 124 (M–383) 29 May 1985 re: JP–A–60 009759 18 Jan. 1985.

*Primary Examiner*—John S. Hilten
*Attorney, Agent, or Firm*—Loeb & Loeb LLP

[57] ABSTRACT

In a tape printing apparatus capable of printing character strings over a plurality of lines on a tapelike printing medium, printing, in which print positions of input lines are reversed or interchanged, can be easily performed.

In printing input character strings over a plurality of lines, print data of each line is unfolded by an amount corresponding to one line of a thermal head 15 (S13, S14). When unfolding of data of all lines is completed (S15), data of each line is rearranged in a line buffer 50 according to a line-corresponding table. A print result in which the print positions are reversed or interchanged can be obtained by printing information in the line buffer.

4 Claims, 12 Drawing Sheets

50 ⌐ 1 BYTE

A     B     C

| LINE BUFFER POSITION | A | B | C |
|---|---|---|---|
| PRINT LINE | 1 | 2 | 3 |

FIG. 6(A)

| LINE BUFFER POSITION | A | B | C |
|---|---|---|---|
| PRINT LINE | 3 | 2 | 1 |

FIG. 6(B)

| LINE BUFFER POSITION | A | B | C |
|---|---|---|---|
| PRINT LINE | 2 | 1 | 3 |

FIG. 6(C)

NO 1　LABEL WRITER

FIG. 9(A)

▽ [1] 1
　 [2] 0
　 [3] N
▽ [1] LABEL WRITER

FIG. 9(B)

LABEL PRINTER
DEMO PRINT

FIG. 10(A)

LABEL PRINTER DEMO PRINT

FIG. 10(B)

LABEL WRITER  TWO TYPE FACES
UP TO 3 LINES
FIVE TAPE SIZES

FIG. 11

TAPE PRINTING APPARATUS

TECHNICAL FIELD

The present invention relates to a tape printing apparatus for printing print data, such as a desired character string, on a tape, and more particularly, to a printing apparatus having a function for printing character strings over a plurality of lines on a tape.

BACKGROUND ART

There has been recently developed a tape printing apparatus for printing a desired character string (characters, signs and the like) on a tapelike printing medium (referred to as "tape" hereinafter). This tape printing apparatus is used widely for business or home use because of its ability to easily and neatly print a heading or a title on the surface of a tape and ease of use in making a backbone of a file and a title label of a videotape.

In particular, the latest printing apparatus disclosed in Japanese Patent Laid-Open No. 5-177905 allows a plurality of lines to be printed on a tape simply and easily with introduction of the concept of "paragraphs". Herein, a paragraph means a set of one or more lines to be simultaneously printed on a tape. FIG. 7(A) shows an example of a tape made by using the concept of paragraphs, which is composed of a first paragraph 70 consisting of one line and a second paragraph 71 consisting of three lines. FIG. 7(B) shows an example of an editing state of this tape. Numerals 72 and 73 denote marks each indicating a head of a paragraph, numerals 74, 75 and 76 denote marks each indicating a head of each line in a paragraph, and numeral 77 denotes character strings input in each line. The paragraphs thus edited are sequentially printed in a feeding direction of the tape, by which a plurality of paragraphs having different numbers of lines can be printed.

Since such a tape printing apparatus is used to make a backbone of a file and a title label of a videotape, it is sometimes required to obtain a vertical print as shown in FIG. 8, and therefore, is generally provided with a vertical print function.

In the case of a backbone of a file, it is required in some use that some characters be arranged laterally in vertical printing. FIG. 9(A) shows a print example in such a case. Characters "NO1" in the first paragraph are arranged laterally even in vertical printing.

However, as the comparison between FIG. 7(A) and FIG. 8 reveals, the tape printing apparatus according to the prior art sequentially prints lines (first, second, ...) from the top of the label in vertical printing while turning each character at a right angle without changing print positions of character strings. Therefore, in order to print "NO1" shown in FIG. 9(A), characters "1", "O" and "N" must be respectively input in the first, second and third lines in reverse order to the arrangement thereof in the editing stage as shown in FIG. 9(B). The user needs to input the characters while inverting the positional relation of the line in idea. Such an input method loads the user heavily, and changing edited results is difficult.

The use of the tape printing apparatus is not limited to printing of Japanese characters, and the tape printing apparatus can be provided for languages of all the countries of the world by changing an input means and stored data. In some languages, vertically written sentences are read from left. FIG. 10 shows an example of such a language. In order to vertically print character strings printed laterally as shown in FIG. 10(A), the character strings need to be printed in the positional relation shown in FIG. 10(B), which causes a similar problem.

Furthermore, it is conceived that input character strings over a plurality of lines may be inverted vertically or interchanged in lateral printing. For example, there is a case where the name of town, the address and the name are respectively input in the first, second and third lines of an address label, and then, the name is required to be printed in the first line in view of a print result. For that purpose, an expensive word processor is provided with an editing function for easily interchanging sentences. However, in a tape printing apparatus required to be less expensive, restrictions on a display device and a memory capacity make it difficult to achieve such a high-level function, and it is necessary to input sentences again after erasing previously input sentences.

DISCLOSURE OF THE INVENTION

The present invention is aimed to solve these problems, and an object of the present invention is to provide a tape printing apparatus which can easily reverse the arrangement order of lines.

In order to achieve the above object, the present invention provides a tape printing apparatus which has an input means for inputting print data such as a character and a sign, and a line number designating means for designating the number of lines in which the input print data is printed, and which can print data of one or more lines input by the input means on a tapelike printing medium, the tape printing apparatus comprising a print order setting means for designating the line print order of the print data over a plurality of lines input by the input means and whose line number is set by the line number designating means.

The tape printing apparatus further comprises a vertical printing designating means to reverse the print order of the plurality of lines when vertical printing is designated by the vertical printing designating means.

According to the above construction, since the position of a line can be easily reversed, a character string in which some characters are arranged laterally even in vertical printing can be easily printed. Furthermore, since a plurality of lines can be interchanged in lateral printing, operability of the tape printing apparatus can be drastically enhanced. Still furthermore, the linkage of the line reverse function to the vertical printing allows printing of a vertically written sentence and a language to be read from left without impairing the use custom thereof.

BRIEF DESCRIPTION OF THE DRAWINGS

FIG. 6 is a view showing line-corresponding tables in the embodiment. FIG. 9 is a view showing a vertical print example of a tape on which some characters are arranged laterally and an input state in the prior art. FIG. 10 is a view showing a print example of a language in which sentences are read from left in vertical printing. FIG. 11 is a view showing a state in which sentences are interchanged in lateral printing.

REFERENCE NUMERALS

1—a tape printing apparatus
11—an input
11A—a power key
11B—a print key
12—a display
15—a thermal head
20—a tape cartridge
21—a platen
22—a tape
23—a thermal transfer ribbon
30—a CPU
31—a ROM
32—a RAM
34—a printer
34A—a stepping motor
34B—a thermal head driver
34C—a motor driver
36—a power supply
50—a line buffer

BEST MODE FOR CARRYING OUT THE INVENTION

The present invention will be described in more detail in conjunction with an embodiment hereinafter.

Figure 1:
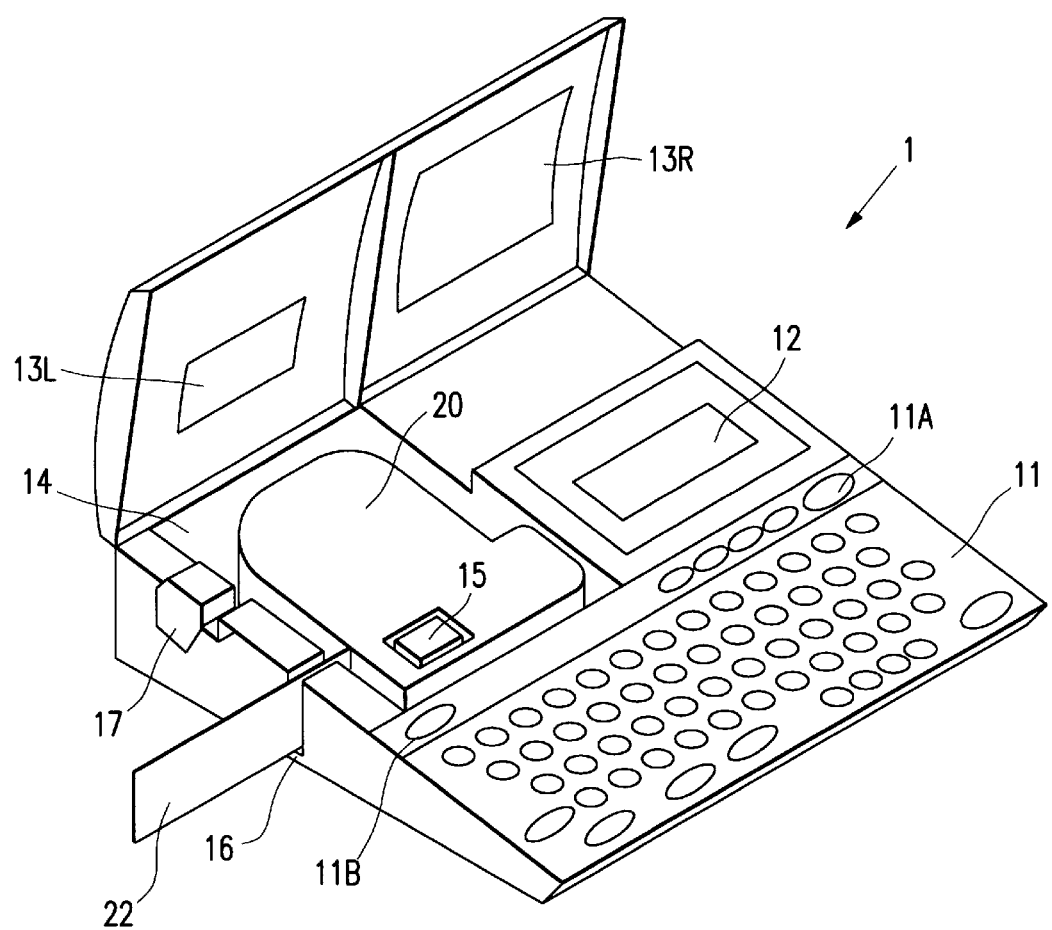
FIG. 1 is an outward view of a tape printing apparatus according to an embodiment of the present invention.

FIG. 1 is a view showing an outward appearance of a tape printing apparatus according to this embodiment. A tape printing apparatus 1 comprises a main case 10 for housing various components, an input 11 provided with 63 input keys, a display 12 for displaying a character string and another information, and a main cover 13 which can open and close. A tape cartridge 20 is loaded in a tape cartridge container 14 located on the upper left of a main body. The main cover 13 is provided with windows 13L and 13R at positions respectively corresponding to the display 12 and the tape cartridge container 14, through which display contents and the loaded tape cartridge can be checked even in a state in which the main cover 13 is closed.

Figure 2:
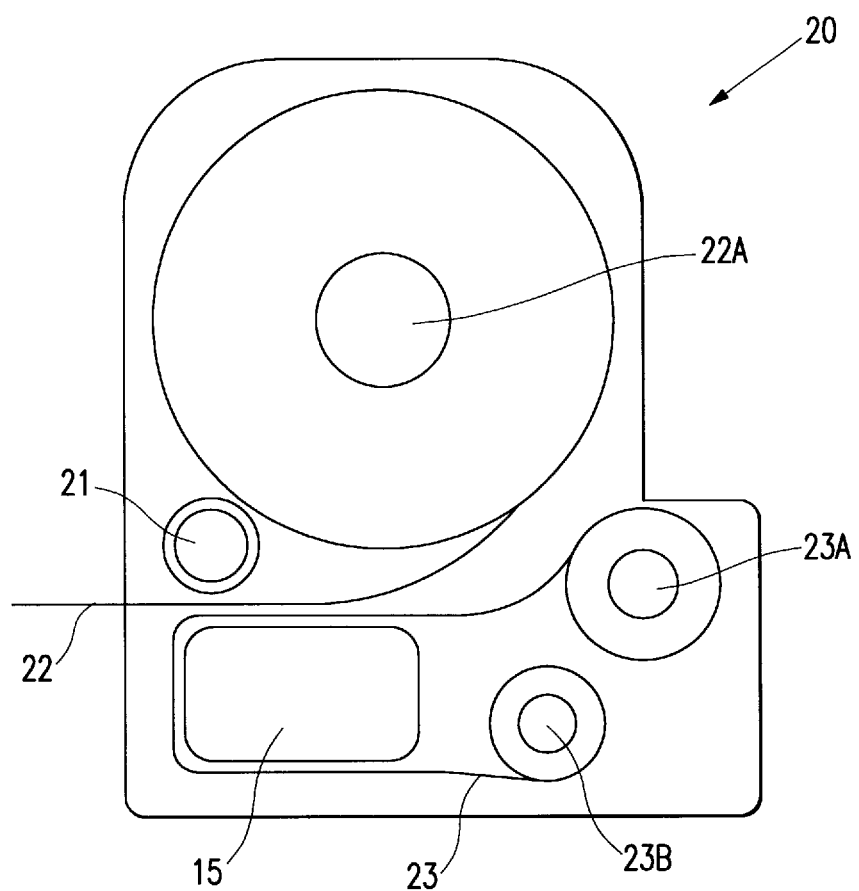
FIG. 2 is a schematic structural view of a tape cartridge in the embodiment.

As shown in FIG. 2, the tape cartridge houses a platen 21 made of a cylindrical member, a tape 22 as a printed medium and a thermal transfer ribbon 23. The tape 22 is wound into a cylinder on a tape core 22A, and the leading end thereof is ejected from the left side of the tape cartridge 20. The thermal transfer ribbon 23 is wound into a cylinder on a ribbon core 23A, and taken up by the rotation of a ribbon take-up core 23B. The tape cartridge 20 is loaded so that a thermal head 15 located to project in the tape cartridge container 14 passes through an approach hole 24 formed in the tape cartridge, by which the tape 22 and the thermal transfer ribbon 23 are located between the thermal head 15 and the platen 21. Furthermore, when the main cover 13 is closed, the thermal head 15 presses the tape 22 and the thermal transfer ribbon 23 against the platen 21 with a preset pressure.

The platen 21 and the ribbon take-up core 23B are connected to an unillustrated motor, which is built in the main body, through gears. Thereby, the rotation of the motor rotates the platen 21 and the ribbon take-up core 23B, and transports the tape 22 and the thermal transfer ribbon 23 sandwiched between the thermal head 15 toward the left of the tape cartridge. Heating elements of the thermal head 15 are appropriately controlled during such transport process of the tape 22 and the thermal transfer ribbon 23, thereby performing thermal-transfer printing on the tape.

When the tape printing apparatus 1 is used, the main cover 13 is first opened as shown in FIG. 1, the tape cartridge 20 is loaded, and the main cover 13 is closed. Then, the power is turned on by operating a power key 11A, and characters to be printed and attributes of the characters are input from the input 11. When instructions to perform printing are given by operating a print key 11B, the input characters are printed on the tape 22 supplied in the tape cartridge 20 according to the input attributes. The printed tape 22 is ejected from a tape ejection opening 16 provided on the left of the main case 10. When the ejection is completed, the tape 22 is cut by a cutter located near the tape ejection opening 16 of the main body by pressing down a cutter button 17, thereby making a separate tape.

Figure 3:
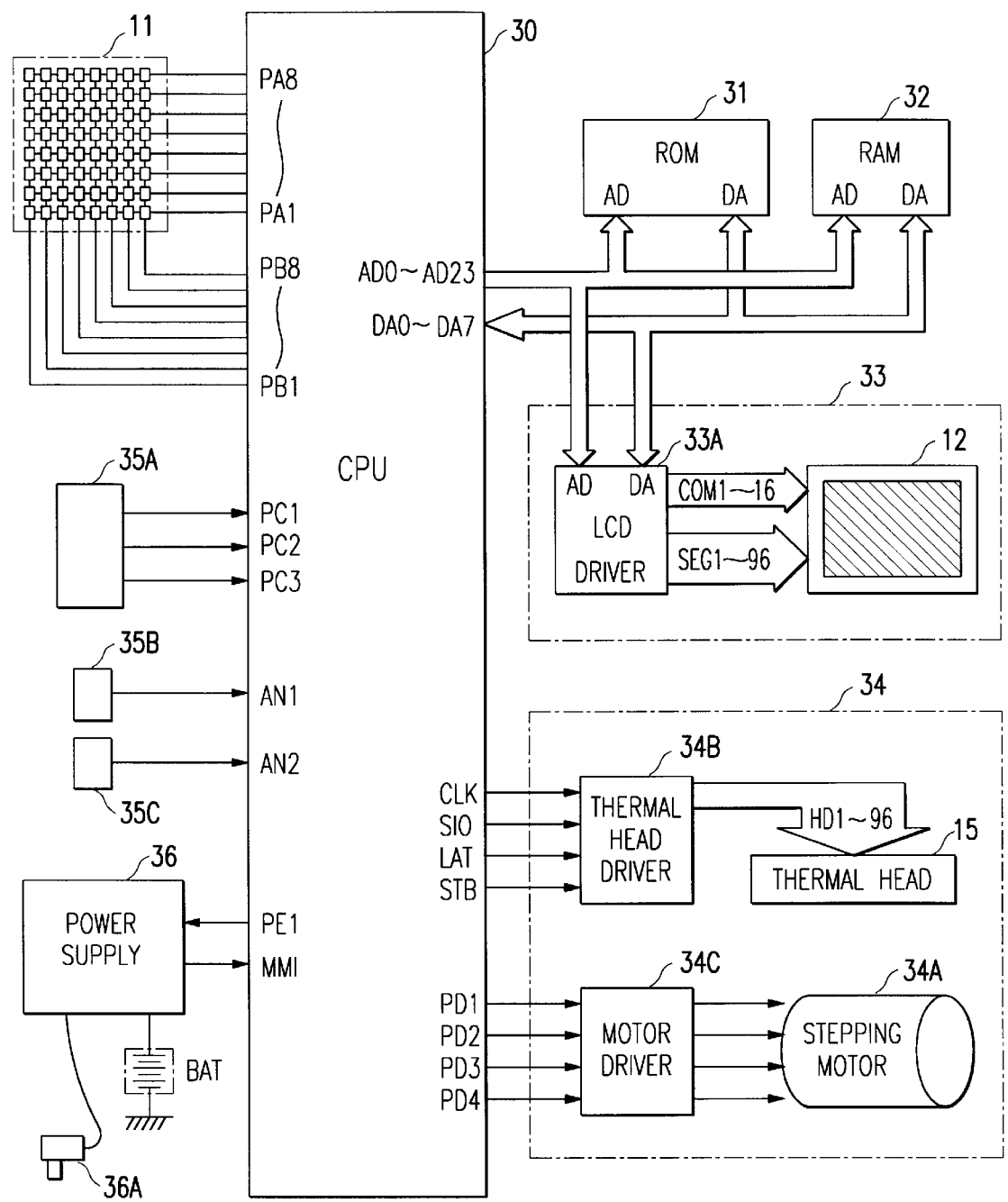
FIG. 3 is a block diagram of a control circuit in the embodiment.

A control circuit built in the main body will now be described. FIG. 3 shows the general configuration of the control circuit. The control circuit comprises a one-chip microcomputer (referred to as "CPU" hereinafter) 30 in which input and output ports are integrated, a ROM 31, a RAM 32 and other various circuits of the input 11, the display 33, a printer 34 and the like.

The ROM 31 stores programs for regulating the operation of the CPU 30, dictionary data used in kana-kanji conversion for inputting kanji, and bitmap data of characters and signs used for display and printing. The program or data designated by an address bus AD is read into the CPU 30 through a data bus DA. The CPU 30 controls the input 11, the display 33 and the printer 34 mentioned above according to the read program.

The RAM 32 is also connected to the CPU 30 through an address bus AD and a data bus DA, stores input data from the input 11, and is also used as a work area in performing various processes, for example, printing and display.

The input 11 is composed of 63 keys. These keys are arranged in a 8×8 matrix, and connected to output ports PA1 to PA8 and input ports PB1 to PB8 of the CPU 30, which makes it possible to judge, based on the relationship between control signals to the output ports and read data from the input ports, which key is operated.

These 63 keys are divided into character keys and function keys. The character keys are keys for inputting characters to be printed, and the function keys are keys for setting character attributes and designating the function, such as printing and editing. Designation of vertical printing and the number of lines and instructions to invert the print position of a line in the present invention are performed by operating the function keys.

The display 33 comprises a liquid crystal panel (referred to as "LCD" hereinafter) 12 for display and a LCD driver circuit 33A for driving the LCD. The LCD 12 is a 16×96 dot-matrix LCD. The LCD driver circuit 33A is connected through an address bus AD and a data bus DA. When data "1" or "0" is written at a designated address in the LCD driver circuit 33A, a dot of the LCD 12 corresponding to the address, where "1" is written, is lighted.

The printer 34 comprises the thermal head 15, a stepping motor 34A, and driver circuits 34B and 34C respectively therefore. The thermal head 15 is formed by one array of heating elements of 96 dots, and is controlled by four signals CLK, SIO, LAT and STB through the thermal head driver 34B.

The procedure for driving the thermal head 15 will be described below. First, signals "1" or "0" for determining ON/OFF of the 96-dot heating elements are transferred by the serial data SIO in synchronization with the clock signal CLK. After the transfer is completed, the LAT signal is changed to "1", the ON/OFF signals transferred by the serial data are assigned to drive circuits respectively for the heating elements. When the STB signal is changed to "1", the drive circuits to which the signals "1" were assigned are turned on and the dots corresponding to the drive circuits generate heat. Such control makes it possible to control the 96-dot heating elements dot by dot, and therefore, to print complicated characters and signs.

The stepping motor 34A has a four-phase structure. When signals 90° out of phase with one another are applied respectively from ports PD1 to PD4 of the CPU 30, the signals are amplified by the motor driver 34C and the stepping motor 34A is driven.

The CPU 30 is also connected to a cartridge information detection circuit 35A, a temperature detection circuit 35B and a voltage detection circuit 35C. Information on the loaded tape cartridge 20 (for example, the width and material of the tape) and information on the temperature near the thermal head 15 and the voltage to be applied are input to the CPU 30, and the time for making the thermal head 15 generate heat and the rotation speed of the stepping motor 34A are determined based on the information.

The control circuit further comprises a power supply 36. The power supply converts the power supplied through a battery BAT or a cable 36A into a voltage according to the standards of the components, such as the control circuit, the thermal head 15, the stepping motor 34A and the LCD 12, and supplies the voltage to the components. In particular, since a conversion circuit for the thermal head 15 has a large capacity and the power loss thereof is high, it is operated efficiently by PE1 to be actuated only when the printer 34 is in operation.

Processing steps in realizing the present invention by software in the above-mentioned control circuit configuration will now be described with reference to FIG. 4.

Figure 4:
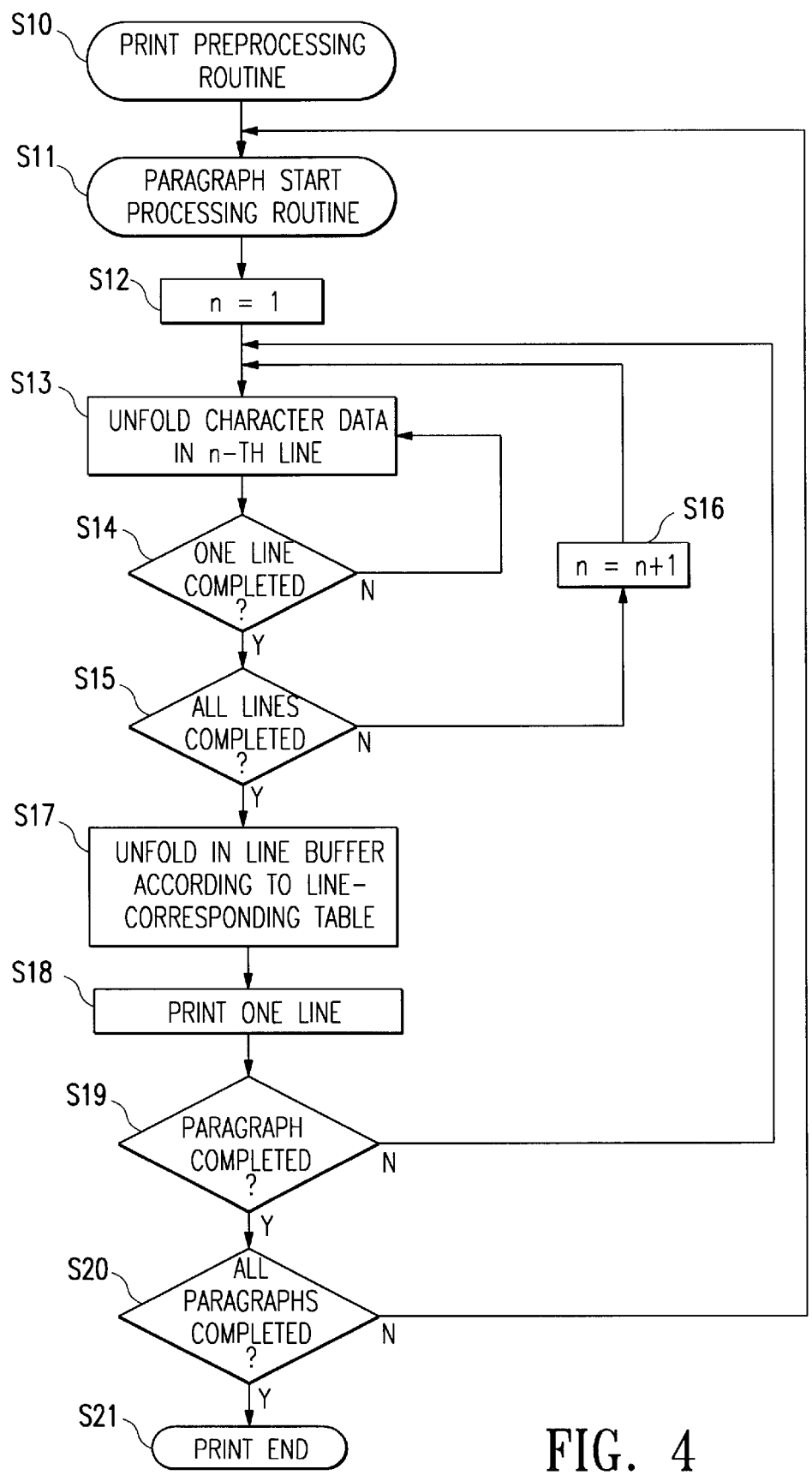
FIG. 4 is a view showing a flow chart of printing in the embodiment.

FIG. 4 is a flow chart showing the printing process. Printing is started at the time when the print key 11B is operated, and prints sentences composed of characters and signs input from the input 11 to the RAM 32 on the surface of the tape 22 supplied from the tape cartridge 20 according to the attributes similarly input from the input 11.

When printing is started, a print preprocessing routine (Step S10) is first carried out. In this step, processing related to attributes of all sentences stored in the RAM 32 (for example, setting of the overall length of the tape and the tape feeding amount before and after printing) is performed, and the tape cartridge information, temperature and voltage are read from the above-mentioned detection circuits to determine the control amount of the printer.

In the next paragraph start processing routine (Step S11), a work area for processing character data in each line is set on the RAM 32 based on the set number of lines in a paragraph and the maximum character size in each line, and then, printing is started.

At the beginning of printing, a line number n, in which character data is to be written, is set at 1 (Step S12), and sequential processing is started from the first line. At this time, if vertical printing and various character ornament functions (enhancement and reverse) are set, they are performed. When processing for one line of the thermal head 15 is completed (Step S14), it is verified whether or not writting of all lines is completed (Step S15). If any line is not written, the line number n is incremented to n+1 (Step S16), and writting of the next line data is performed.

Figure 5A:
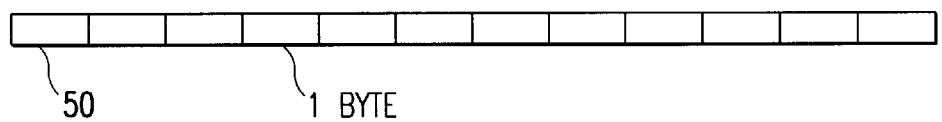
FIG. 5 is a view showing the structure of a line buffer in the embodiment.

When one-line processing of data in all the lines is completed, the data is written on a line buffer 50 set in the RAM 32. FIG. 5(A) shows the structure of the line buffer, which is set as successive RAM areas of 96 bits, that is, 12 bytes to achieve a one-to-one correspondence between one dot of the thermal head and one bit of the line buffer.

Accordingly, the data is unfolded in the line buffer according to a line-corresponding table.

Figure 5B:
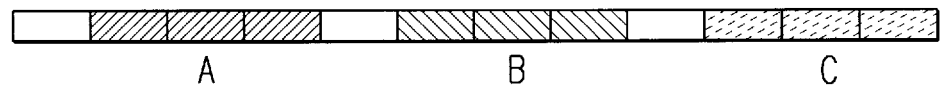
Figure 7A:
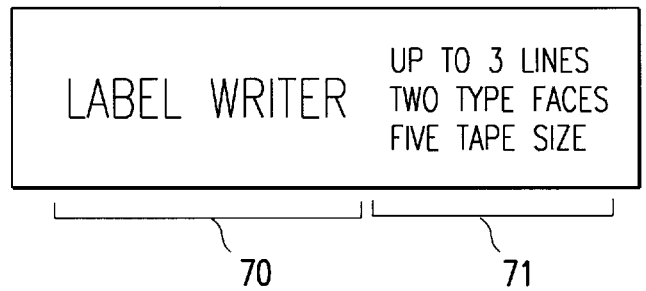
FIG. 7 is a view showing a print example and an input state example of a plurality of lines in the tape printing apparatus.
Figure 7B:
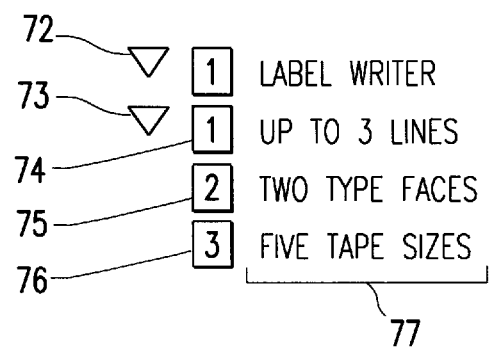
Figure 8:
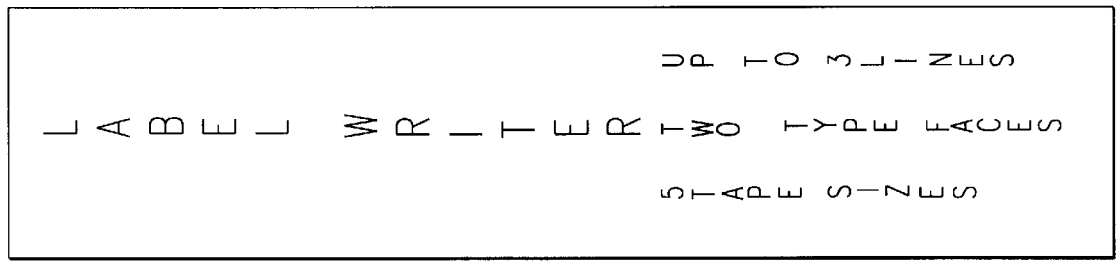
FIG. 8 is a view showing a vertical print example of the tape printing apparatus.

The line buffer and line-correspondent tables are respectively shown in FIGS. 5 and 6. FIG. 5(A) shows a structure example of the line buffer, and A, B and C in FIG. 5(B) each denote a print area. FIG. 6 shows the correspondence between the print areas and actual print lines. (A), (B) and (C) in FIG. 6 show cases in which normal printing, reverse printing and order designation are respectively selected. It is determined by software to select (A) in lateral printing and select (B) in vertical printing, or may be set by hardware. The preparation of the line-corresponding table shown in (C) before printing allows printing designated by the user.

The data thus written in the line buffer 50 is sequentially transferred to the thermal head driver 34B by the SIO terminal as it is, and data for each of all the lines is simultaneously printed (Step S18).

When the one line processing is completed, it is verified (Step S19) whether or not all the lines in the paragraph are processed. If not, processing is repeated for the next paragraph from the paragraph start processing (Step S11). After completing the processing on all paragraphs, printing is ended (S21).

Thus, according to the tape printing apparatus of this embodiment, the print position can be easily inverted in printing a plurality of lines without imposing a difficult input method on the user. Furthermore, printing in an arbitrary order is made possible by designating the print order after inputting characters.

Figure 12:
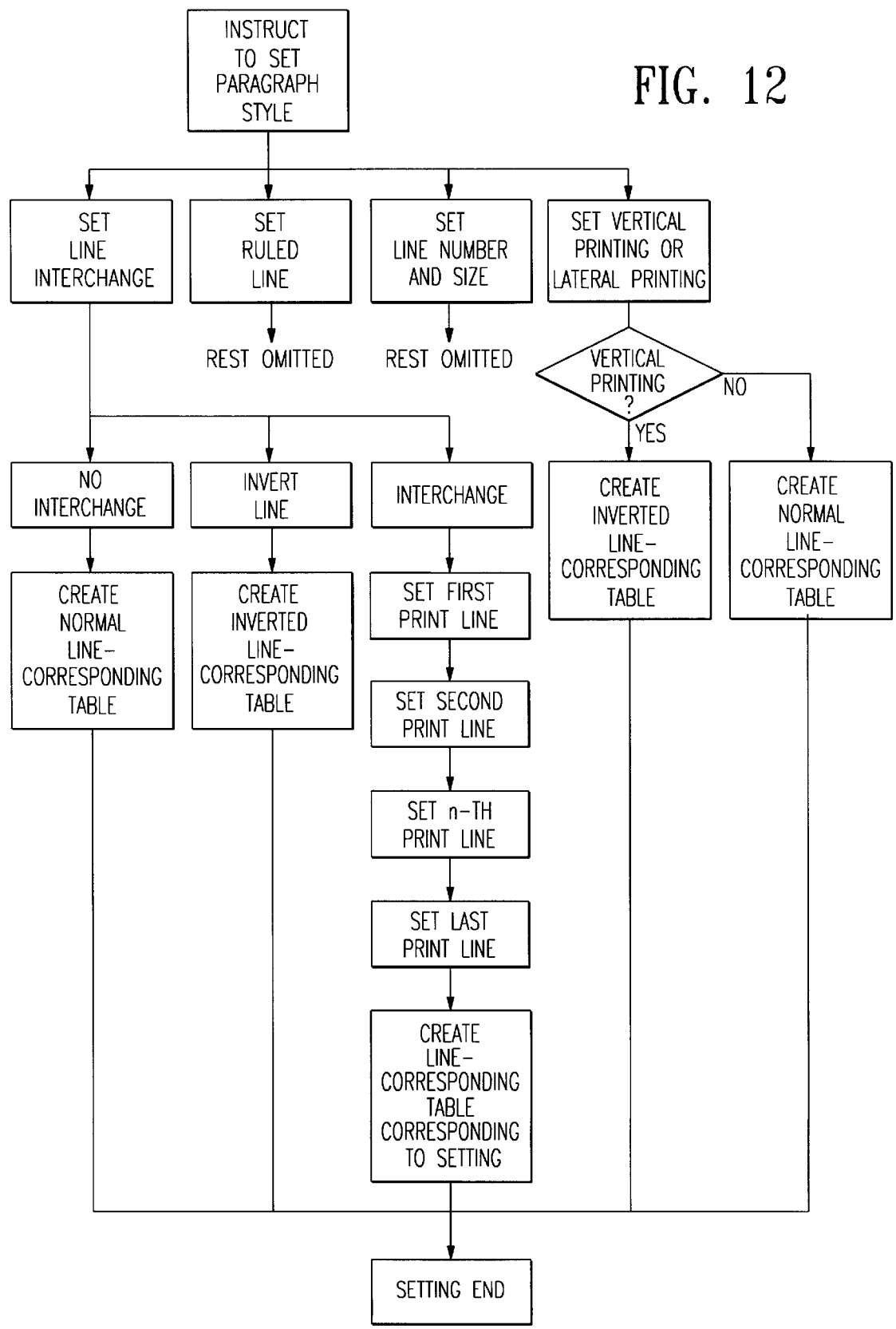
FIG. 12 is a view explaining the procedure for designating interchange or inversion of lines.

FIG. 12 shows steps for designating the print order. When the print form (character size, font and the like) is set for each paragraph, a print order different from or identical with the indicated order is selected, or vertical printing or lateral printing is selected. In changing the print order, printing in an order designated by the user or printing, in which the line order is inverted, can be selected.

The tape printing apparatus of the present invention is not limited to the above embodiment, and realized by various types of embodiments, for example, by using a handwriting recognition device or a dial input device as the input, or an ink-jet printer as the printer.

INDUSTRIAL APPLICABILITY

As described above in conjunction with the embodiment, according to the tape printing apparatus of the present invention, since the position of a line can be inverted when a plurality of lines are printed, vertical printing of a heading, in which some characters are arranged laterally, can be easily achieved without performing difficult input including vertical inversion, and printing can be performed in a state in which the positional relation of lines of previously input sentences is inverted. Accordingly, operability of the tape printing apparatus can be enhanced drastically.

We claim:

1. A tape printing apparatus which has input means for inputting print data such as a character and a sign, and line number designating means for designating the number of lines in which the input print data is printed, and which can print the data over one or more lines input by said input means on a tapelike printing medium, the tape printing apparatus comprising:

print order setting means for designating the line print order of the print data over a plurality of lines which is input by said input means and whose line number is set by said line number designating means.

2. A tape printing apparatus according to claim 1, wherein said print order setting means has a line-corresponding table for storing line position information on each of the plurality lines and the designated print order in correspondence with each other.

3. A tape printing apparatus according to claim 1, further comprising:

vertical printing designating means; and means for printing the print data over a plurality of lines in a reversed line print order when vertical printing is designated by said vertical printing designating means.

4. A method for printing character strings onto a tape of a tape printer, said method comprising:

a) pressing a function key on a keyboard to define a first paragraph to be printed on the tape;

b) pressing a function key on the keyboard to select the beginning line number of text for the paragraph;

c) selecting whether the text is to be printed vertically or horizontally on the tape;

d) entering the text to be printed in the normal way in which a person would read the text;

e) pressing a function key on the keyboard to reverse the printing order of the text;

f) repeating at least steps a)–d) for a second paragraph;

g) using a central processing unit (CPU) to prepare a line table in a random access memory, with text being rearranged in the table from the order in which the text was entered in step d) if the user has selected the reverse order printing function in step e);

h) transferring data from the random access memory to a line buffer; and i) printing the text for the various paragraphs on a line-by-line basis on the tape.

* * * * *